Patented July 20, 1943

2,324,680

UNITED STATES PATENT OFFICE 2,324,680

ADHESIVE COMPOSITION

Albert P. d'Andrea, Brooklyn, N. Y.

No Drawing. Application August 2, 1940,
Serial No. 350,115

2 Claims. (Cl. 106—170)

This invention relates to the art of making colored transparencies such as lantern slides, and those of larger size. An object of this invention is to improve upon the process and product of prior Patent 2,073,387. A further object is to simplify the process of said patent and enable the product to be produced by means of a brush, or spray, without the need for heating. Yet a further object is to provide a product of this type in which the contraction or change in shape is greatly reduced. Still another object is to eliminate the need for the glass foundation on which a layer of material had to be formed before the colors were brought in contact with it. Another object is to reduce the danger of the colors of some pigments being affected.

The preferred process of this invention contemplates an adhesive consisting of U. S. P. collodion, 3600 cc.; linseed oil, 100 cc.; amyl acetate, 150 cc. The ingredients are mixed. The amyl acetate functions to thin the solution, lengthen its drying time, and retard the formation of and remove blush, which is a whitish aspect due to incorporated moisture. Too much amyl acetate takes too long to dry and forms too thin a film, which is not desired if the material is being built up by successively applied coatings. Too little amyl acetate may increase the risk of blush forming but if the air is dry no amyl acetate need be used.

The linseed oil functions to prevent undue contraction and expansion of the film permanently or under stress or in drying. The collodion alone contracts in drying and the linsed oil reduces such deformation. Without the linseed oil, the collodion in setting would deform enough to peel from a rigid foundation, but with the linseed oil this danger is greatly reduced. Too little linseed oil fails to control this distortion of the collodion film in drying. No more than enough linseed oil for this purpose need be used.

The collodion functions principally as a quick setting adhesive. Other adhesives such as those mentioned in said prior patent may be used and still other quick setting adhesives may be used. The camphor previously used as an ingredient of the adhesive has been removed because sometimes affecting the color of certain pigments.

The mixture may be formed and applied at room temperatures without the need for heating as described in said patent. Another important difference is that this adhesive may be brushed or sprayed onto the color picture. By allowing the film a minute or two to dry before applying a successive coat, the number of such coats applied may be enough to give the material any desired thickness. Each film becomes intimately united so that the whole forms a tough, flexible, transparent, homogeneous layer that is resistant to water, easily removed from the paper or other foundation on which the colors were formed.

This process seems to function with all inks or pigments except the water soluble gums such as are commonly used in water colors. The collodion mixture of this invention is believed to function physically and chemically. Physically the pigment or ink is enveloped in a mold formed by the collodion mixture. Chemically the collodion mixture dissolves or reacts with the binder of the ink or pigment so that the colors become a part of the collodion mixture instead of a part of the old material that was printed. This chemical action is not necessary in the case of pencil or crayon marks and typewriter characters which are unlike ink in lacking any similar binder for the particles. This invention works with pencil, charcoal, and other such marks. This chemical action applies also to waxes, oils, and varnishes. In all these instances the ink or pigment is enclosed by the collodion mixture without any change in the color values. With water soluble gums the vehicle for the pigment is not chemically dissolved or affected in the same way as with the oils, waxes, varnishes, and other bases that are not water soluble. The solvent action referred to is believed to be performed by the alcohol, ether, and amyl acetate in the collodion mixture.

After spraying or brushing the color picture which is to be transferred from a paper, and building up the film to the desired thickness, the paper may be removed from the colors by mechanically separating the paper as described in said prior patent as by moisture and rubbing. An important advantage over the prior patent is elimination of heat and the ability to apply the new envelope for the colors merely by brushing or spraying instead of having to form a fairly thick layer of the adhesive material and applying the colors to it. Should the old foundation for the colors which are to be transferred, have been non-flexible like stone or glass, the collodion mixture after having been applied and built up may be removed with the colors as by soaking the old foundation in water which enables moisture to get in between the pigment and the old foundation, enabling the old to be stripped from the new collodion mixture foundation with the colors embedded therein. This process may if desired, eliminate the necessity for printing the colors on paper, that is the colors may be formed on some other foundation such as rubber, stone, copper, zinc, aluminum, or other used foundations for receiving printing or colors, and the transparent collodion mixture applied to the pigment or ink for their removal from the old foundation.

As described in said patent, the color images may be built up in registry to enhance the strength of the new transparency. Of course while the term "transparency" has been used to designate the product of this invention, it will be understood that like an ordinary lantern slide the colors are more strictly translucent and only the new foundation is transparent. As used in the appended claims the term "colored image" includes ordinary printing or black and white prints formed as described above.

A transparent adhesive made according to said prior Patent 2,073,387, would if heated to about 175 degrees F. for about five minutes contract about 16% in bulk and surface, whereas under this invention the improved adhesive under similar conditions contracts much less, in fact less than about 2% in bulk and surface. The built up adhesive is flexible, tough, and transparent and needs no coating on either side or backing of glass as mentioned in the previous patent. Under the prior patent if several colored images were built up in superposed registry, after a lapse of time it has been discovered they do not all stay in their original relative registry but one or more of the films may become distorted.

I claim:

1. A quick drying flexible transparent adhesive capable of enclosing a colored print or ink in an envelope or mold, to which the print or ink is adapted to adhere more firmly than it does to the foundation on which the ink or color was printed, and comprising approximately 3600 cc. collodion, 100 cc. linseed oil, and 150 cc. amyl acetate.

2. A quick drying, flexible, transparent, adhesive capable of enclosing a colored print or ink in an envelope or mold to which the color or ink is adapted to adhere more firmly than it does to the foundation on which the ink or color was printed, said adhesive comprising in the major part collodion and in the minor part linseed oil, the ratio of the volume of collodion to that of the linseed oil being approximately 36 to 1.

ALBERT P. D'ANDREA.